(12) United States Patent
Abousleiman et al.

(10) Patent No.: US 8,887,889 B2
(45) Date of Patent: Nov. 18, 2014

(54) DEVICE FOR UNCOUPLING LOADED SHAFTS, FOR A POWER TRANSMISSION UNIT

(75) Inventors: Vincent Abousleiman, Courbevoie (FR); Sylvain Canard, La Garenne Colombes (FR); Andre Raymond Christian Deperrois, Paris (FR); Romaric Fritz, La Garenne Colombes (FR)

(73) Assignee: Hispano Suiza, Colombes (FR)

( * ) Notice: Subject to any disclaimer, the term of this patent is extended or adjusted under 35 U.S.C. 154(b) by 88 days.

(21) Appl. No.: 13/510,509

(22) PCT Filed: Nov. 15, 2010

(86) PCT No.: PCT/EP2010/067453
§ 371 (c)(1),
(2), (4) Date: May 17, 2012

(87) PCT Pub. No.: WO2011/061140
PCT Pub. Date: May 26, 2011

(65) Prior Publication Data
US 2012/0222933 A1 Sep. 6, 2012

(30) Foreign Application Priority Data
Nov. 18, 2009 (FR) ...................................... 09 58158

(51) Int. Cl.
| | |
|---|---|
| F16D 25/08 | (2006.01) |
| F16D 27/118 | (2006.01) |
| F16D 25/061 | (2006.01) |
| F16D 11/00 | (2006.01) |

(52) U.S. Cl.
CPC ............ *F16D 27/118* (2013.01); *F16D 25/061* (2013.01); *F16D 25/082* (2013.01); *F16D 2011/002* (2013.01)
USPC .................. 192/69.91; 192/84.92; 192/85.15; 192/114 R (58) Field of Classification Search
USPC ............... 192/84.92, 69.91, 90, 85.57, 85.18, 192/85.15, 85.49
See application file for complete search history.

(56) References Cited

U.S. PATENT DOCUMENTS

| | | | |
|---|---|---|---|
| 2,428,336 A | | 9/1947 | Munschauer |
| 3,498,151 A | * | 3/1970 | King ................................ 74/356 |
| 4,042,088 A | * | 8/1977 | Schmohe ................... 192/114 R |

(Continued)

FOREIGN PATENT DOCUMENTS

| | | |
|---|---|---|
| DE | 101 26 485 | 12/2002 |
| EP | 1 749 995 | 2/2007 |
| WO | 87 02106 | 4/1987 |

OTHER PUBLICATIONS

International Search Report Issued Jan. 26, 2011 in PCT/EP10/67453 Filed Nov. 15, 2010.

*Primary Examiner* — Troy Chambers
*Assistant Examiner* — Lillian Nguyen
(74) *Attorney, Agent, or Firm* — Oblon, Spivak, McClelland, Maier & Neustadt, L.L.P.

(57) ABSTRACT

A device for uncoupling a drive shaft of a piece of equipment from an input shaft. The device includes a claw including first teeth and first splines to (i) move longitudinally along a first of the shafts by co-operating with second splines borne by the second of the shafts and (ii) engage or disengage the first teeth in relation to the second teeth positioned on the second shaft. The device also includes a longitudinal movement mechanism including a stationary part acting on a longitudinally mobile piece to move the claw between a coupling position and an uncoupling position. The longitudinal movement mechanism drives the claw by co-operation between a rotationally fixed piece and a piece that is linked to the claw and rotated therewith, a longitudinal clearance being maintained during operation between the piece that is rotationally fixed and the rotated piece.

12 Claims, 4 Drawing Sheets

(56) References Cited

U.S. PATENT DOCUMENTS

| | | |
|---|---|---|
| 4,685,550 A | 8/1987 | Metcalf |
| 5,031,740 A * | 7/1991 | Deichstetter et al. ............ 192/24 |
| 2004/0168879 A1 * | 9/2004 | Skorucak ........................ 192/90 |
| 2008/0060898 A1 * | 3/2008 | Liu ............................. 192/69.91 |

* cited by examiner

DEVICE FOR UNCOUPLING LOADED SHAFTS, FOR A POWER TRANSMISSION UNIT

The field of the present invention is that of the driving of power shafts and, in particular, that of systems for disengaging, during operation, shafts which transmit high torques.

Mechanical equipment and, in particular, equipment mounted on an aeronautical engine is driven by power shafts which are connected via a gear assembly to an input shaft, from which they take the mechanical power necessary for the operation of the equipment concerned.

The power in question may be particularly high and, for example in the case of aeronautical equipment such as a starter-generator, may reach torques in the order of 600 Min at a rotational speed of 16000 rpm. The axial frictional force exerted on the pinions rises in such a case to 4500 N. Moreover, it is necessary to provide the possibility of uncoupling the shaft of the equipment from that of the engine, during the course of an emergency procedure, in order to disengage the equipment in the case of failure and thus avoid comprehensive breakdown. Such a procedure is necessary, for example, in the case of a maneuver to get out of a critical situation. Such uncoupling systems also have to be implemented in very restricted environments.

When subsequently putting the equipment back into service it is also necessary to provide a recoupling maneuver of the shaft of the equipment, once the emergency situation has stopped. This procedure is thus carried out when the shafts are at a standstill or at reduced speed, and unloaded, the frictional forces on the teeth thus being partially eliminated.

A system which provides said features has been disclosed in the patent EP 1412651, which proposes a claw coupling system between two shafts rotating in the extension of one another. A claw coupling is a toothed device permitting two mechanical parts to be coupled and uncoupled. The claw coupling in this case consists of a shaft which is concentric with the shafts to be coupled, and which has at one of its ends a planar ring extending radially, on which a ball bears to generate the displacement. The ball is displaced circumferentially relative to the shafts, following a helicoidal trajectory implemented by a groove formed in the casing.

During this helicoidal movement, the ball rolls in the groove and remains in abutment against the radial ring. It exerts a force in one direction which is offset relative to the axis of the claw coupling. This results in a torque which impairs the displacement of the claw coupling and in a risk of jamming or blocking. The ball, moreover, is activated by a rolling movement without sliding along the groove, but by a sliding movement along the radial ring. This creates parasitic forces exerted on the ball which interfere with its movement and which, taking account of the very high frictional forces which are exerted on said parts, may make the fine-tuning of such a system difficult.

The German patent application DE 10126485 is also known, said patent application disclosing a disengaging system in which, in the operating position, the assembly of parts fainting the claw coupling is driven in rotation. This results in a mobilization of the masses which are only activated during the disengagement and do not have any use during normal operation. The drawbacks associated with said system are the creation of undesirable inertial moments and the wear of said rotating parts.

The object of the present invention is to remedy said drawbacks by proposing a system for uncoupling shafts operating under high loads, which does not have some of the drawbacks of the prior art and, in particular, in which the majority of the parts providing the disengagement are fixed during normal operation.

To this end, the subject of the invention is a device for uncoupling the drive shaft of equipment from an input shaft, said device comprising a claw coupling provided with first teeth and first splines so as to be displaced longitudinally along a first of said shafts by cooperation with second splines carried by the second of said shafts and to engage or disengage said first teeth on or from second teeth positioned on the second of said shafts, said device further comprising a longitudinal displacement means comprising a fixed part to displace said claw coupling between a coupled position and an uncoupled position, the resultant force transmitted by said longitudinal displacement means to the claw coupling being oriented along the axis of rotation of said first shaft and having its point of application located on said axis, characterized in that said longitudinal displacement means drives said claw coupling by the cooperation of a part fixed in rotation with a part connected to the claw coupling and driven in rotation therewith, a longitudinal clearance being maintained during operation between said part fixed in rotation and said part driven in rotation.

Said configuration guarantees the absence of wear during normal operation of the parts used for disengagement, whilst avoiding the creation of parasitic torques which could hinder the displacement of the claw coupling along the shaft on which it is mounted.

Preferably, the longitudinally mobile part carries a stop or a ball bearing, a first ring of said stop being fixed to said part and the second ring being mobile in rotation and positioned opposite a rotating plate extending radially relative to said claw coupling.

Advantageously, a clearance is located between the mobile ring and the rotating plate.

In a variant, the longitudinally mobile part carries a hydrodynamic stop covered by an anti-friction coating, positioned opposite a rotating plate extending radially relative to said claw coupling.

Preferably, the longitudinally mobile part carries a recoupling member capable of being deployed radially to cooperate with an element of said claw coupling and to drive said claw coupling into its recoupled position.

In a second embodiment, the part extending radially comprises a cavity into which is inserted, during the uncoupling process, a radially mobile element, fixed to said claw coupling in translation a parallel to said first shaft.

Preferably, the radially mobile element is a ball positioned in a radial bore formed in said claw coupling.

More preferably, the ball, during normal operation, is maintained in position via the bore in a housing formed in said first shaft, by a longitudinal extension of said part extending radially.

Advantageously, the cavity comprises a face oriented obliquely relative to the axis of rotation of said first shaft, so as to permit the return of the ball to the bore during a recoupling operation.

In a particular embodiment, the first and second teeth are helicoidal teeth, exerting on one another a force designed to uncouple said teeth.

The invention also relates to equipment comprising a device for uncoupling its drive shaft from an input shaft as disclosed above, and to an aeronautical engine on which such equipment is mounted.

The invention will be understood more clearly and further objects, details, characteristics and advantages thereof will emerge more clearly during the explanatory detailed description which follows of several embodiments of the invention given by way of purely illustrative and non-limiting example, with reference to the accompanying schematic drawings, in which.

Figure 1:
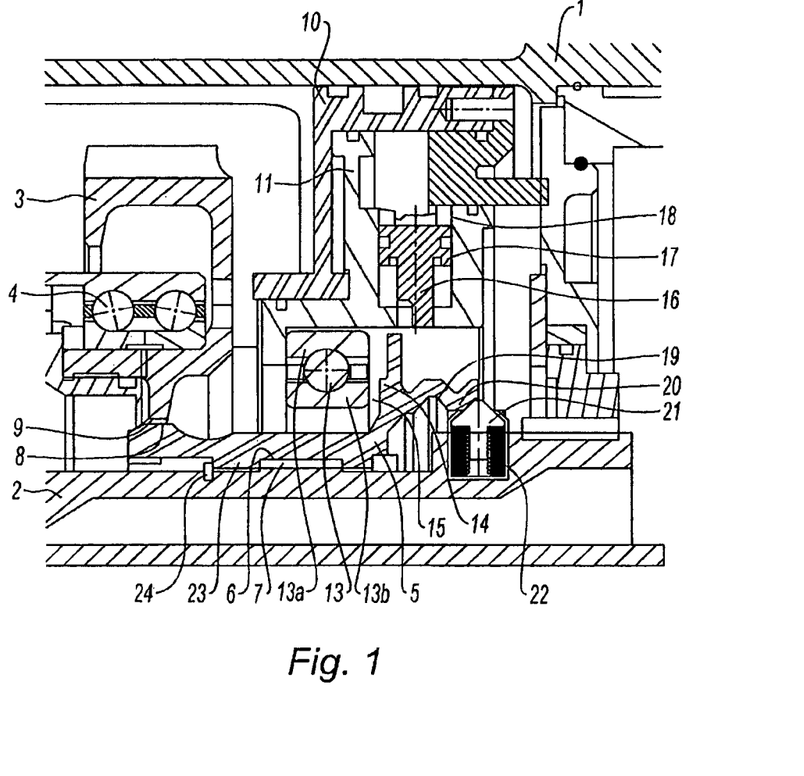
FIG. 1 is a sectional view of a device for uncoupling power shafts according to a first embodiment of the invention.

With reference to FIG. 1, equipment of the starter-generator (also known as S/G) type is seen, consisting of a casing 1 enclosing a device for coupling its power shaft, known as the output shaft 2, onto a drive shaft 3 driven by the machine on which the starter-generator is mounted. The drive shaft 3 is carried by bearings 4 and rotates about the same axis as that of the output shaft 2. Said two shafts, during normal operation, are coupled to one another by means of a hollow cylindrical part known as a claw coupling 5, also coaxial with the two shafts, and which surrounds the output shaft 2. Said claw coupling 5 comprises first splines 6 on its internal face, which cooperate with second splines 7 opposite said first splines on the external face of the output shaft 2. Due to said two series of splines, the claw coupling 5 is capable of being displaced longitudinally along the output shaft 2, whilst remaining coupled therewith.

The claw coupling also comprises, at one of its ends, first teeth 8 on its external face which are capable of cooperating with second teeth 9 carried on its internal face by the drive shaft 3. Depending on the position of the claw coupling 5 on the output shaft 2, the first teeth 8 may either be engaged on the second teeth 9 (coupled position illustrated in FIG. 1), or released, the starter-generator no longer being driven by the drive shaft 3 (uncoupled position illustrated by the last view of FIG. 2).

A hydraulic uncoupling device is, in the first embodiment, illustrated in the right-hand part of FIG. 1. Generally, in the remainder of the description, the right-hand side is that which is the most remote from the first and second coupling teeth and which corresponds, in terms of direction, to the uncoupling process.

The device comprises a hydraulic chamber 10 in which a piston 11 circulates, said piston being displaced parallel to the axis of the shafts. Said piston 11 is displaced to the right of FIG. 1 to carry out an uncoupling process, under the action of hydraulic pressure transmitted into the left-hand part of the chamber 10 via a channel, not shown. It is displaced toward the left during an operation to recouple the shafts.

On its lower part, the piston 11 carries a stop or a ball bearing 13 positioned parallel to the axis of the shafts, and of which a first fixed ring 13a is rigidly connected to the piston 11 and of which the second ring 13b is free in terms of rotation, rolling without sliding on the balls of the stop 13. Longitudinally opposite said mobile ring 13b is located a rotating plate 14 extending radially from the axial part of the claw coupling 5. A clearance 15 is present in normal operation (i.e. in the coupled position) between the mobile ring 13b of the thrust ball bearing and the plate 14 of the claw coupling. Said clearance is eliminated during the uncoupling process, the mobile ring 13b being driven in the direction of the plate 14 by the piston 11 and thus coming into contact therewith to displace the claw coupling 5 and cause the separation of the first and second teeth 8 and 9. Due to this clearance 15, it is observed that the piston 11 and the two rings 13a and 13b are not activated during normal operation and are not driven in rotation. The mobile ring 13b, in turn, is driven in rotation only during the disengaging sequence.

On its right-hand part the claw coupling 5 has a saddle-shape with a first double branch 19 shape, such as a reversed V-shape, and a second single branch 20 shape. Opposite the single branch 20 is positioned a pusher 21 of which the shape, in negative form, is that of the double branch 19 and in which it is incorporated under the action of a spring 22. The pusher 21 maintains the claw coupling 5 either in the coupled position which corresponds to its position in the double branch 19 or in the uncoupled position which corresponds to its position against the single branch 20. An axial stop 23 placed on the claw coupling 5, and which cooperates with a radial shoulder 24 on the output shaft 2, also limits the displacement of the claw coupling toward the left, so as to maintain the first and second teeth 8 and 9 in alignment. The couple consisting of the pusher 21 and the axial stop 23 thus ensures a relatively stable position of the claw coupling relative to the output shaft 2. The position of the axial stop 23 is defined so that the clearance 15 has the desired value and thus the mobile ring 13b of the stop 13 is not permanently activated in normal operation.

In FIG. 1, only one ball 13 and one pusher 21 appear, as the figure is a sectional view of the uncoupling assembly but the system comprises a plurality of balls and pushers, having a number greater than or equal to 2, and which are uniformly distributed over the circumference of the rotating plate 14 with the purpose of providing a resultant thrust oriented perfectly axially and of avoiding possible jamming or blocking of the claw coupling 5.

FIG. 1 also shows a device for recoupling the two shafts and returning the claw coupling 5 to its initial position. Said device consists, in principle, of a finger 16 extending radially relative to the axis of the two shafts opposite the external face of the rotating plate 14. Said finger is positioned at the end of a recoupling piston 17 which is displaced inside a cylinder 18. The admission of a pressure, whether hydraulic or pneumatic, in the cylinder above the recoupling piston 17 causes the descent of said piston and that of the finger 16 in the direction of the plate 14. A restoring spring (not shown) is positioned below the re-engaging piston 17 and is designed to return the finger 16 into the cylinder 18 when the output pressure of the finger is not present.

The finger 16 extends radially, in the extended position, by a sufficient length to protrude beyond the external face of the plate 14, such that it is able to drive the claw coupling 5 in translation toward the left, along said axis. The cylinder 18, with its recoupling piston 17 and the finger 16, is carried by the piston 11 so that it moves longitudinally therewith and thus the finger 16 remains substantially opposite and to the right of the rotating plate 14.

Figure 2:
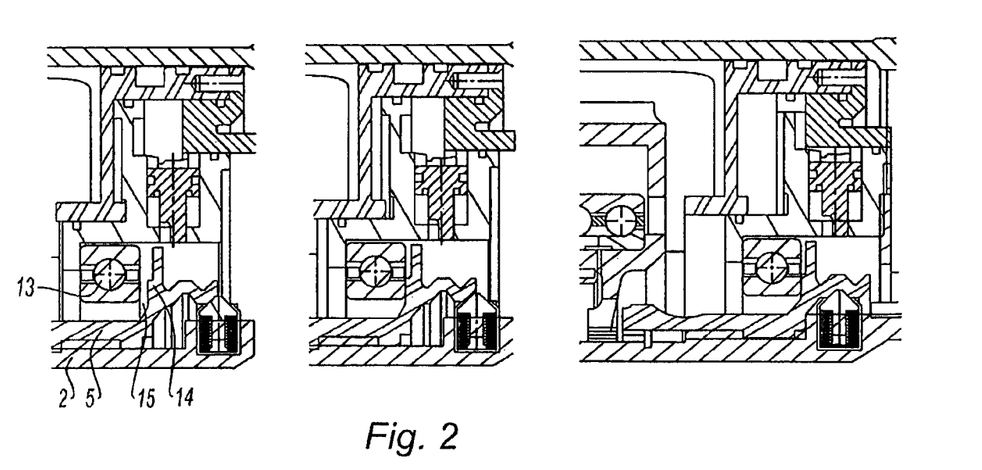
FIG. 2 is a sequential view of the operation for uncoupling power shafts by means of a device according to the first embodiment of the invention.

FIG. 2 shows three steps in the uncoupling of the two shafts. In the left-hand view, the two shafts are coupled, in a position identical to that of FIG. 1. A longitudinal clearance 15 exists between the mobile ring 13b of the ball bearing and the rotating plate 14. In the central view, the piston 11 is displaced by a length equal to that of the preceding clearance, under the action of pressure transmitted into the left-hand part of the chamber 10. In this position, the displacement imparted to the piston 11 has only caused the clearance 15 to be taken up and has not yet displaced the claw coupling 5. The two shafts 2 and 3 are still coupled. Finally, in the right-hand view, as the application of pressure in the left-hand part of the chamber 10 has been continued, the piston 11 has covered the entirety of its path and has come to bear against the right-hand lateral wall of the chamber 10. This being the case, it has driven the ball bearing 13 and, therewith, the rotating plate 14 which is fixed thereto by its friction on the mobile ring 13b. The pusher 21 has been displaced from its position against the single branch 20 to that in the double branch 19. In this position the claw coupling 5 has been displaced by a length such that the teeth 8 and 9 are separated. The two shafts 2 and 3 are then uncoupled, the drive shaft 3 being able to continue to rotate while the assembly formed by the output shaft 2 and the claw coupling 5 is no longer driven and progressively stops. Once the uncoupling has been carried out, the equipment is mechanically disconnected from the engine, from which it no longer takes any power.

A second embodiment will now be described with reference to FIG. 3. The elements of the device which have the same function as in the first embodiment are denoted by the same reference numerals and are not described again. In this case, the first teeth 8 are positioned on a substantially radial part of the claw coupling 5 and positioned perpendicularly to the second teeth 9 of the drive shaft 3.

In contrast to FIG. 1 the splines 6 and 7 are in this case helicoidal. As a result, they exert on one another an axial force which tends to move them apart and, as a result, to uncouple the two shafts automatically.

Figure 3:
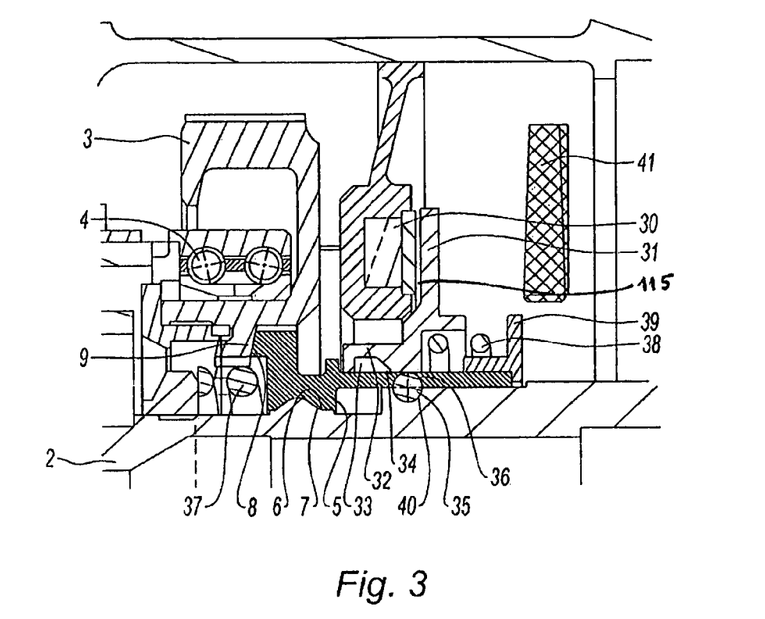
FIG. 3 is a sectional view of a device for uncoupling power shafts according to a second embodiment of the invention.

Visible in FIG. 3, without the disclosed shape being imperative, is an electromagnetic actuator 30 which is positioned so as to exert on a ferromagnetic plate 31 a repelling force oriented parallel to the axis of the shafts 2 and 3. The plate 31 extends radially relative to the axis of the shafts and opposes a plurality of electromagnetic actuators (of which only one is visible in the section of FIG. 3) which are uniformly distributed over the circumference of the plate 31 with the purpose of providing a thrust oriented in a perfectly axial manner, without misalignment, and avoiding possible jamming or blocking of the claw coupling 5. A clearance 115 is maintained during operation between the electromagnetic actuator 30 which is fixed, and the ferromagnetic plate 31 which is driven in rotation by the claw coupling 5, during normal operation. Said clearance avoids any wear between the rotating parts and the parts fixed in rotation, during normal operation.

The plate 31 is continued at its internal end by a longitudinal extension 32 of which the function is to maintain the balls 35 in a housing 40 hollowed out of the external face of the output shaft 2, during operation. The internal cylindrical face of the longitudinal extension 32 has a series of cavities 33 designed to serve as housings for the balls 35, during the uncoupling process, said balls then leaving their housing 40 to release the claw coupling 5 longitudinally relative to the output shaft 2. Each cavity 33 has on its right-hand side a conical or planar shape, forming a ramp 34 on which the balls are able to roll.

The claw coupling 5 is traversed in its thickness by a plurality of bores 36 positioned regularly along its circumference and corresponding in terms of angle to the cavities 33. The balls 35 are positioned in said holes and their diameter corresponds substantially to the diameter of the hole, so that they are able to traverse radially the claw coupling, whilst being maintained longitudinally. In the coupled configuration, the balls 35 are positioned on the internal side in the housing 40, and on the external side against the internal face of the longitudinal extension 32 of the plate 31. In this manner they ensure the blocking in axial translation of the claw coupling 5, via the contact which they have, on the one hand, with the bores 36 and, on the other hand, with the housing 40. Said three elements rotate simultaneously, which avoids any deterioration of the ball when the two shafts remain coupled, the role of the ball thus being to counter the uncoupling force generated by the helicoidal splines.

In said second embodiment the longitudinal extension 32 of the plate 31 is positioned in abutment against the claw coupling 5, in normal operation. A spring 38 maintains the longitudinal extension 32 in abutment against the claw coupling 5 to prevent the release of the ball 35, said ball taking up the axial forces generated by the helicoidal splines 6 and 7.

Moreover, a spring 37 assists the uncoupling force and makes it possible to maintain the claw coupling 5 uncoupled from the input drive shaft 3. In the coupled position, the force of the spring 37 is taken up by the ball 35.

Figure 4:
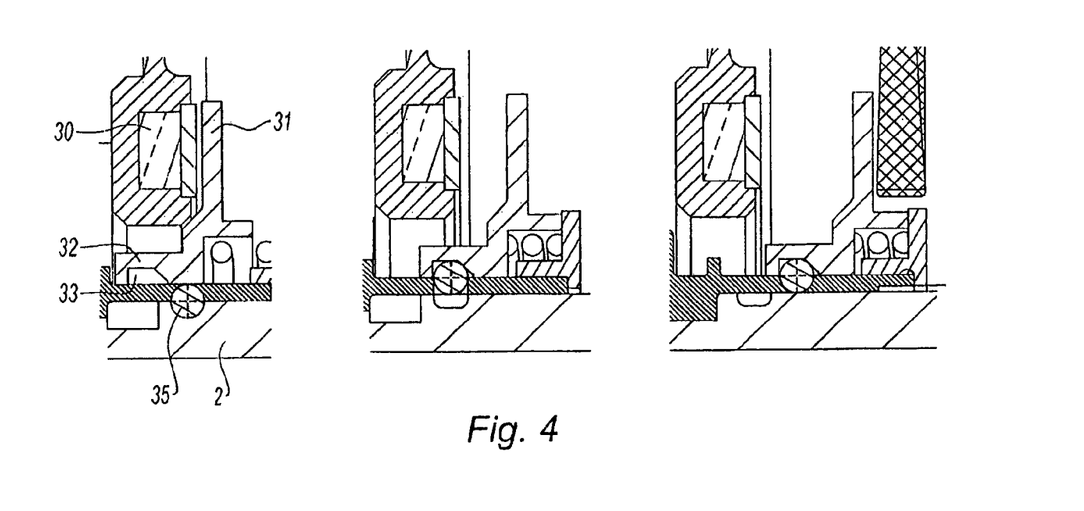
FIG. 4 is a sequential view of the operation for uncoupling power shafts using a device according to the second embodiment of the invention.

FIG. 4 shows three steps during the uncoupling of the claw coupling in the second embodiment. In the left-hand view the two shafts are coupled, in a position identical to that of FIG. 3. The ball 35 is positioned under the longitudinal extension 32 of the plate 31, in a housing created by the bore 36. In the second and third views, the electromagnetic actuator 30 has pushed back the plate 31 and its longitudinal extension 32 to the right by compressing the restoring spring 38. The cavity 33 is thus brought opposite the ball 35 which is inserted there (third view) under the action of centrifugal force. In the second view the ball is located in the cavity 33 and no longer blocks the translation of the claw coupling 5 which may be uncoupled under the action of the helicoidal splines and the support spring 37. The third view shows the plate 31 in the extreme position, pushed back to a maximum extent under the action of the electromagnetic actuator and the claw coupling 5 moved fully to the right. As the claw coupling has been displaced by a sufficient length, the first teeth 8 of the claw coupling are detached from the second teeth 9 of the drive shaft 3. The two shafts 2 and 3 are then uncoupled, the drive shaft 3 being able to continue to rotate while the assembly formed from the output shaft 2 and the claw coupling 5 is no longer driven and progressively stop 39. Once the uncoupling process has been completed, the equipment is disconnected mechanically from the engine, from which it no longer takes power.

Figure 5:
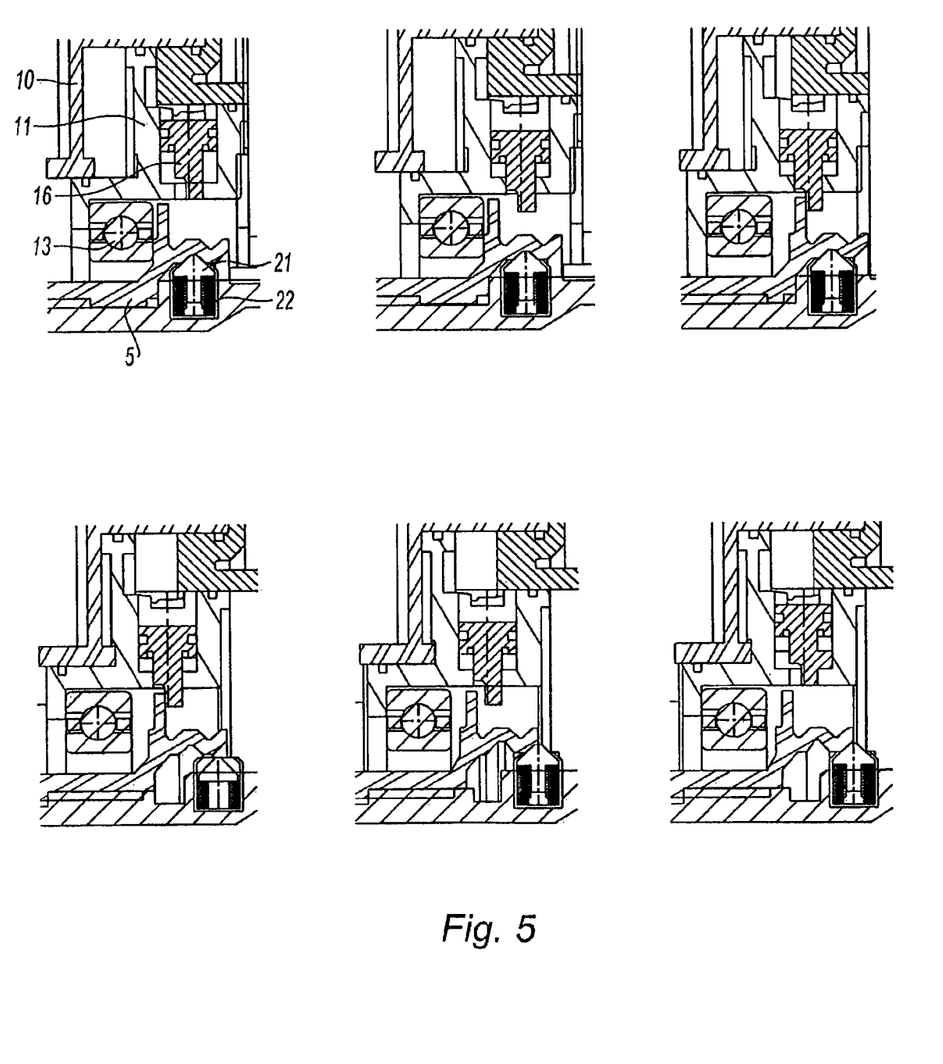
FIG. 5 is a sequential view of the operation for recoupling power shafts using a device according to the first embodiment of the invention.

Referring now to FIG. 5, six steps are seen for the operation of re-engagement of the output shaft 2 in the case of the first embodiment of the invention. In the view from the left, the two shafts are uncoupled, in an identical situation to that illustrated in the last step of FIG. 2. The piston 11 is in contact with the wall located to the right in the figure and the volume of the right-hand part of the chamber 10 is considerably reduced due to the configuration of the chamber 10. Said right-hand part is positioned opposite a supply of fluid, not shown, such as compressed air. In the second view, compressed air has been injected into the right-hand part of the chamber 10 which has had the effect of pushing back the finger 16 outside the chamber in the direction of the rotating plate 14 of the claw coupling. In the third view of FIG. 5, as the pressure injected into the right-hand part of the chamber 10 has been increased further, the piston 11 is seen displaced to the left until the clearance existing between the finger 16 and the plate 14 has been eliminated. In the fourth view the piston has been displaced further, driving therewith the finger 16, which in turn drives the claw coupling 5 via its external face. The piston 11 is shown at the end of its travel, in abutment against the left-hand face of the chamber 10; in this position the claw coupling has advanced sufficiently to compress the pusher spring 22 and to cause the pusher 21 to emerge from its position in the double branch 19. In the fifth view, the pusher 21 is engaged under the action of its spring 22 against the single branch 20 and, at the same time, has pushed the claw coupling even further to the left; said claw coupling has thus returned to its initial position, i.e. that where its first teeth 8 are engaged in the second teeth of the drive shaft 3. The clearance 15 between the plate 14 and the mobile ring 13b of the ball bearing is stabilized at its nominal value. In the sixth view, the pressure injected into the right-hand part of the chamber 10 has been released and the finger 16 is returned into its cylinder under the action of its restoring spring, thus leaving the path free for the passage of the rotating plate 14 in the event that a further uncoupling process might be necessary.

Figure 6:
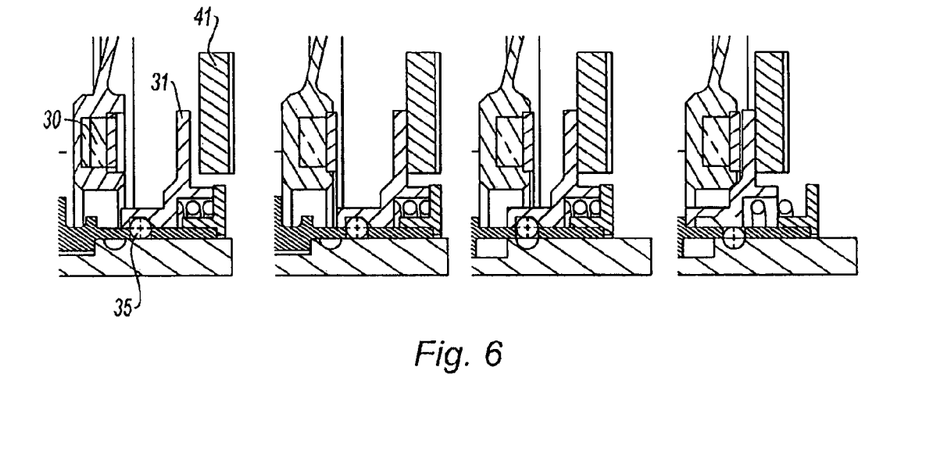
FIG. 6 is a sequential view of the operation for recoupling power shafts using a device according to the second embodiment of the invention.

FIG. 6 shows the same four steps for carrying out the operation of re-engaging the output shaft, in the second embodiment. The figure shows a blade 41 which has the function of generating by its displacement the re-engagement by mechanical means. This blade may be maneuvered from the outside of the equipment by means of a handle (not shown). In the first view, the blade is in the resting position and the plate 31 is positioned to the right in an identical position to that of the last view of FIG. 4, the two shafts being uncoupled. In the second view, the blade 41 has been displaced to the left and has come into contact with the plate 31. In the third view, the blade 41 has pushed back the plate 31 in the direction of re-engagement and has brought the ball 35 opposite its housing 40. In the fourth view, the plate 31 has been brought into its initial position, opposite the electromagnetic actuator 30, ready to be pushed back again if required. Under the action of the force exerted, the support spring 37 has been compressed and the teeth 8 and 9 of the claw coupling and of the drive shaft are recoupled. The ball 35 has been pushed back into its housing 40 by the action of the ramp 34 and is located positioned between the longitudinal extension 32 and the output shaft 2, thus releasing the claw coupling 5 in translation to permit it to respond again to a possible uncoupling command. At the same time, the restoring spring 38 is relaxed, once again maintaining the longitudinal extension 32 in abutment against the claw coupling 5 and preventing the release of the ball 35.

Now, with reference to FIGS. 2 and 5, the procedure of an operation will be described for uncoupling the shafts by the use of a device according to the first embodiment. The operation for putting into service and recoupling will now be described.

When a critical situation occurs and it is necessary to disengage equipment on an aeronautical engine, a command is sent, either by the pilot or by a safety control system, in the direction of the equipment in question. As regards the starter-generator shown in the figures, said command leads to the admission of hydraulic pressure in the left-hand part of the chamber 10 which pushes back the piston 11 in the right-hand direction, i.e. toward the uncoupled position. This pressure is advantageously taken from the pressure of the oil for lubricating the equipment, which makes it possible to carry out this operation without using means which are external to the equipment and to dispense with putting in place specific means to this end. The displacement of the piston 11 to the right progressively moves the ball bearing 13 toward the rotating plate 14 of the claw coupling 5 by eliminating the clearance 15. When the bearing 13 is in contact with the rotating plate 14, its mobile ring 13b is abruptly driven in rotation and starts to roll without sliding on the balls, the fixed ring 13a in turn remaining immobile relative to the piston 11. As the piston 11 continues it displacement, the bearing 13 pushes the rotating plate and drives it to the right by a sufficient length so that the first teeth 8 of the claw coupling are uncoupled from the second teeth 9 of the drive shaft 3. No longer driven, the mobile ring 13b, the claw coupling 5 and the output shaft 2 progressively decelerate and finally stop. The desired uncoupling of the shafts is thus implemented, whatever the force which could be exerted on the teeth 8 and 9 during operation.

The uncoupling operation is preferably carried out in the workshop or at least when the engine is at a standstill, so that no significant force is exerted on the teeth which would make the coupling thereof very difficult mechanically. The residual pressure which potentially exists in the left-hand part of the chamber 10 is eliminated by a conventional technique and compressed air, or any other appropriate fluid, is injected into the right-hand part of the chamber 10. Said pressure initially pushes back the finger 16 which protrudes in the direction of the claw coupling 5 and its plate 14. Once the finger has fully emerged, the pressure of the compressed air pushes back the piston 11 to the left which in a first step has the effect of displacing the ball bearing 13 by a length equal to the clearance 15 without the claw coupling moving and then, in a second step, of displacing both the stop 13 via its fixed ring 13a connected to the piston and the claw coupling 5 via the finger 16, whilst conserving the clearance 15 between said two parts. The dimensioning of the chamber 10 and of the claw coupling 5 is such that when the piston 11 arrives in abutment against the left-hand part of the chamber 10, the first teeth 8 are located in the region of the second teeth 9 with which from now on they are again coupled. To finish, the pressure in the right-hand part of the chamber 10 is vented, the finger 16 is retracted and the equipment is ready to be put back into service, a new uncoupling process being possible by a hydraulic pressurization of the left-hand part of the chamber 10.

As regards the second embodiment, the uncoupling and recoupling processes take place in the following manner, with reference to the sequence of operations disclosed in FIGS. 4 and 6.

The uncoupling command from the pilot or safety system triggers a current to pass in the coil of the electromagnetic actuator 30 which generates a repulsion force on the ferromagnetic plate 31. Said plate is displaced to the right, with reference to FIG. 3, compressing the restoring spring 38. As the claw coupling is no longer urged by the ball 35 to remain in contact with the drive shaft 3, the first and second teeth 8 and 9 push one another back due to the helicoidal shape given to the splines 6 and 7. The uncoupling process continues as the plate 31 is displaced.

The longitudinal extension 32 of the plate 31 is displaced relative to the ball 35 which arrives opposite the ramp 34 and the cavity 33. Under the action of the centrifugal force which is exerted thereon, the ball rises in the cavity and couples the displacement of the claw coupling 5 to that of the plate 31. The ball then follows the displacement of the claw coupling on which it exerts no force and the uncoupling of which it no longer opposes.

As indicated in FIG. 6, the recoupling of the shafts requires the mechanical intervention of an operator, who acts on a handle to displace the blade 41. Said blade pushes back the plate 31 in the direction of the re-engagement. The ball is initially displaced in the direction of its housing 40, then forced into said housing by the ramp 34 to become recaptured between the longitudinal extension 32 and the output shaft 2. Although the path of the plate 31 continues, the longitudinal extension 32 rolls on the ball 35 which it maintains against the output shaft 2. At the same time, the longitudinal extension 32 comes into contact with the claw coupling 5 which it displaces to the left and thus forces the first and second teeth 8 and 9 to be recoupled.

At the end of travel of the blade 41 the claw coupling is in a position where its first teeth 8 are coupled to the second teeth 9 of the drive shaft 3; the ferromagnetic plate 31 is located in the vicinity of the actuator 30 without coming into contact therewith, a clearance 115 having been recreated to avoid the wear thereof by friction, during normal operation. The re-engagement is completed and the operator may return the blade 41 to its resting position (shown in FIG. 3) by acting on the handle provided to this end.

Further variants are possible. It is conceivable, in particular, to replace the thrust ball bearing 13 in the first embodiment by a hydrodynamic stop which slides against the rotating plate 14 of the claw coupling. Such a stop is covered by an anti-friction coating, i.e. having a low coefficient of friction, of the Teflon type made by Dupont of Nemours and is pressed against the surface of the plate; the surfaces in contact are lubricated by pressurized oil. Such a configuration eliminates the acceleration of the rotating elements such as the mobile ring 13b, which are abruptly set in rotation in the first embodiment during the uncoupling process.

What is claimed is:

1. A system for uncoupling a first shaft of equipment from a second shaft, the system comprising:
   a claw coupling including first teeth and first splines so as to be displaced longitudinally along the first shaft by cooperation with second splines carried by the first shaft and to engage or disengage the first teeth on or from second teeth positioned on the second shaft; and
   an uncoupling device comprising a first fixed part acting on a longitudinally mobile part during uncoupling to displace the claw coupling between a coupled position and an uncoupled position, and
   an axial translation blocking device,
   wherein during uncoupling, the uncoupling device transmits a resultant force to the claw coupling, the force being oriented along the axis of rotation of the first shaft and having its point of application located along the axis, and during uncoupling the uncoupling device drives the claw coupling by cooperation of a second part fixed in rotation with a part connected to the claw coupling and driven in rotation therewith,
   wherein in the coupled position, the axial translation blocking device maintains the claw coupling at a first axial position without the uncoupling device transmitting the force, and a longitudinal clearance is maintained between the second part fixed in rotation and the part connected to the claw coupling and driven in rotation, and
   wherein in the uncoupled position, the axial translation blocking device maintains the claw coupling at a second axial position without the uncoupling device transmitting the force.

2. The device as claimed in claim 1, in which the longitudinally mobile part carries a stop or a ball bearing, a first ring of the stop being fixed to the longitudinally mobile part and a second ring being mobile in rotation and positioned opposite a rotating plate extending radially relative to the claw coupling.

3. The device as claimed in claim 2, in which the longitudinal clearance is located between the second mobile ring and the rotating plate.

4. The device as claimed in claim 1, in which the longitudinally mobile part carries a stop covered by an anti-friction coating, positioned opposite a rotating plate extending radially relative to the claw coupling.

5. The device as claimed in claim 2, in which the longitudinally mobile part carries a recoupling member configured to be deployed radially to cooperate with an element of the claw coupling and to drive the claw coupling into its recoupled position.

6. The device as claimed in claim 1,
   wherein the longitudinally mobile part comprises a cavity into which is inserted, during an uncoupling process, the axial translation blocking device, and
   wherein the axial translation blocking device is a radially mobile element, and is axially fixed relative to the first shaft.

7. The device as claimed in claim 6, in which the radially mobile element is a ball positioned in a radial bore formed in the claw coupling.

8. The device as claimed in claim 7, in which the ball, during normal operation, is maintained in position via the bore in a housing formed in the first shaft by a longitudinal extension of the part extending radially.

9. The device as claimed in claim 7, in which the cavity comprises a face oriented obliquely relative to the axis of rotation of the first shaft, to permit return of the ball to the bore during a recoupling operation.

10. The device as claimed in claim 1, in which the first and second splines are helicoidal splines, exerting on one another a force to uncouple the splines.

11. Equipment comprising a device for uncoupling the first shaft from the second shaft as claimed in claim 1.

12. An aeronautical engine on which is mounted equipment as claimed in claim 11.

* * * * *